May 3, 1966     O. A. ULLRICH     3,249,004
DEPTH-OF-FIELD CORRECTION FOR PROJECTION SYSTEM
Filed Oct. 14, 1963     3 Sheets-Sheet 1
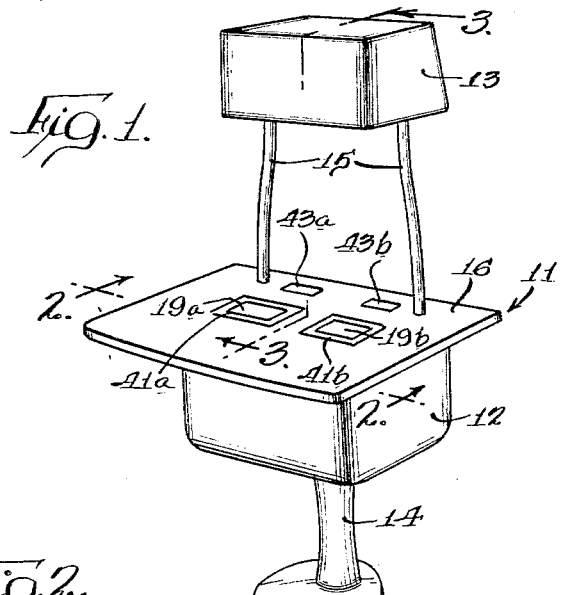
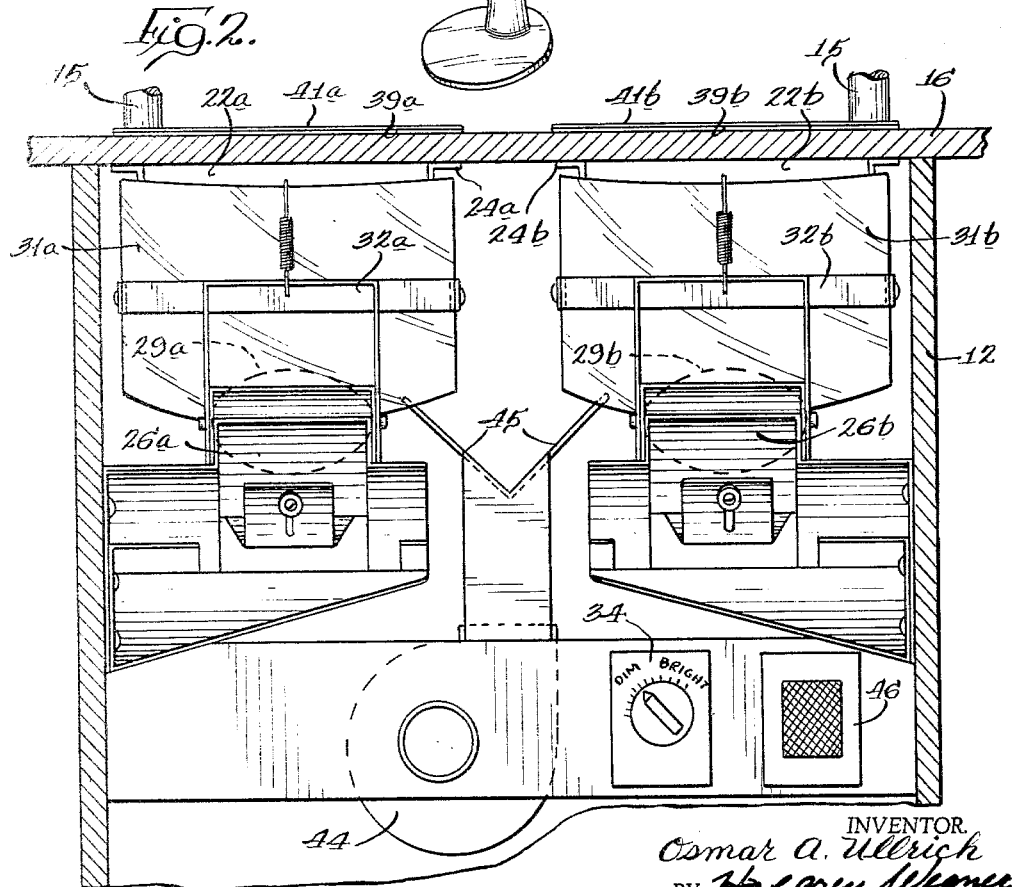
INVENTOR.
Osmar A. Ullrich
BY Hofgren, Wegner,
Allen, Stellman & McCord
Att'ys May 3, 1966 O. A. ULLRICH 3,249,004
DEPTH-OF-FIELD CORRECTION FOR PROJECTION SYSTEM
Filed Oct. 14, 1963 3 Sheets-Sheet 2
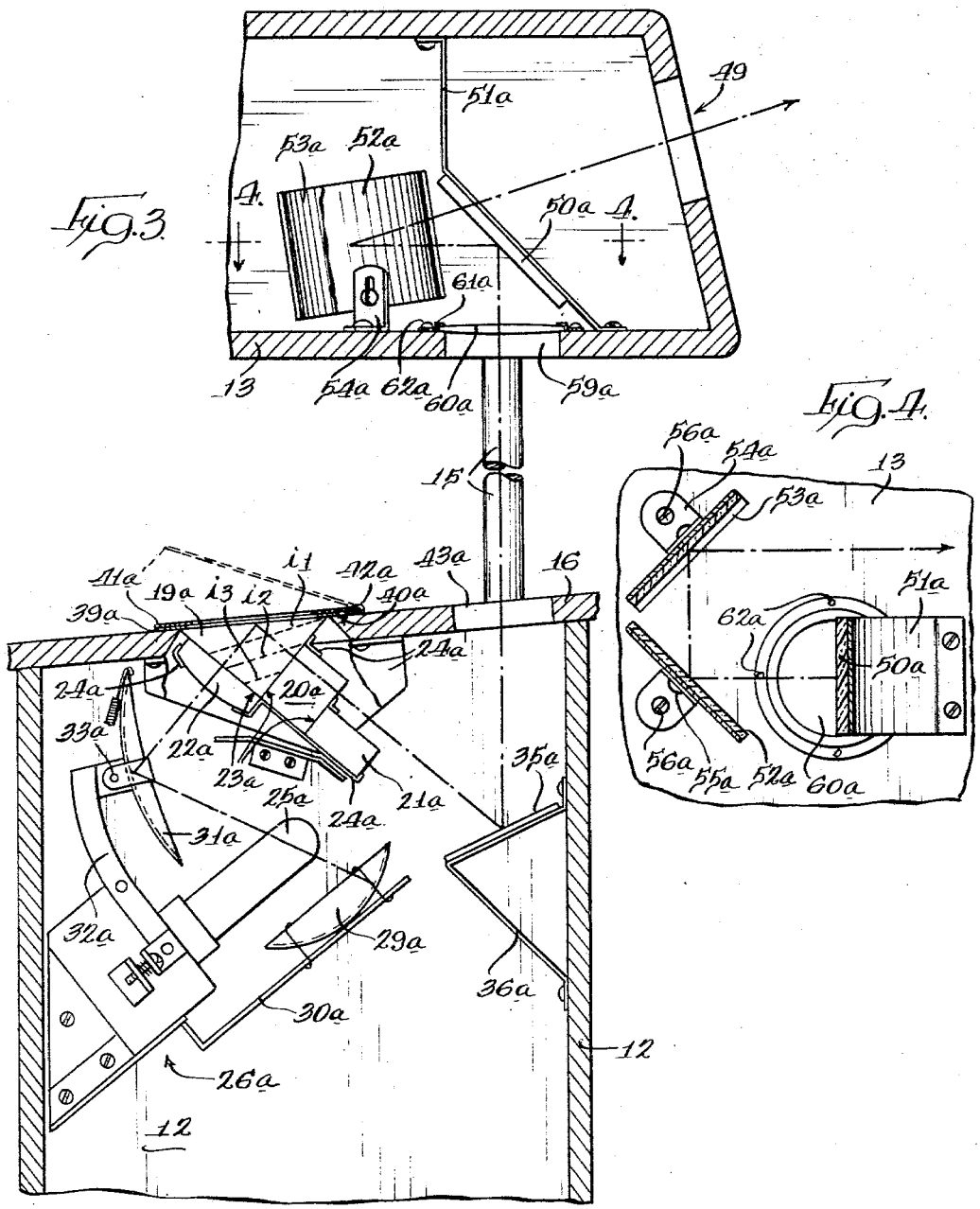

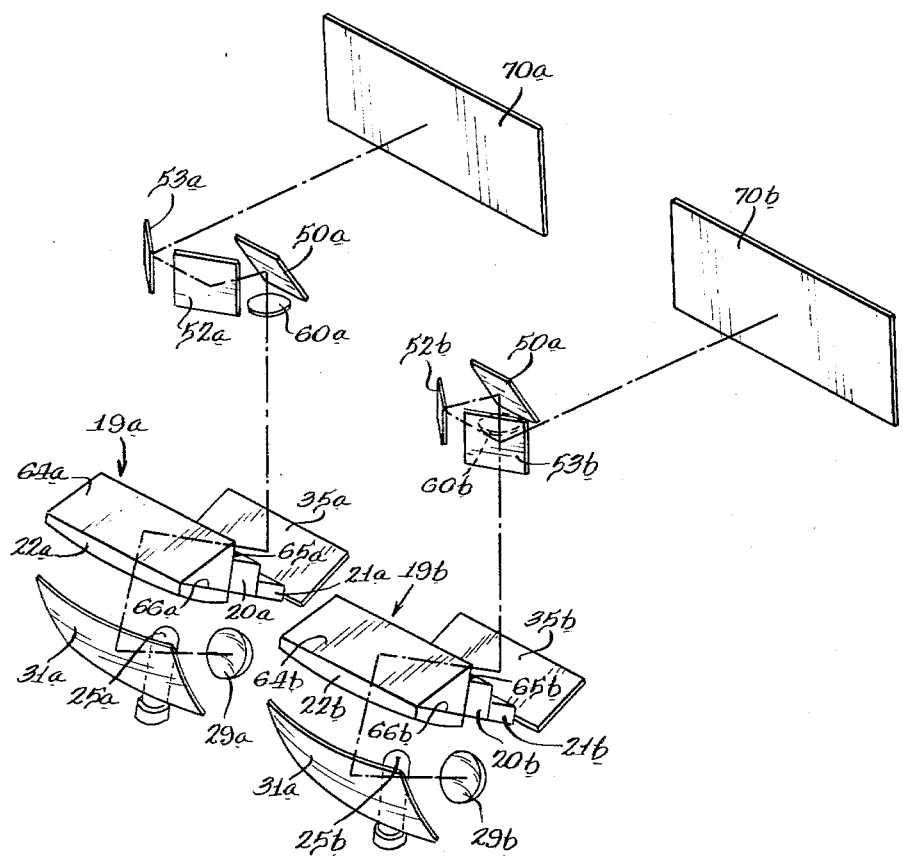

United States Patent Office 3,249,004
Patented May 3, 1966

3,249,004
DEPTH-OF-FIELD CORRECTION FOR
PROJECTION SYSTEM
Osmar A. Ullrich, Columbus, Ohio, assignor, by mesne
assignments, to Brunswick Corporation, Chicago, Ill.,
a corporation of Delaware
Filed Oct. 14, 1963, Ser. No. 315,840
13 Claims. (Cl. 88—24)

This invention relates to projection systems and especially to such systems useful in projecting bowling scores in a bowling establishment. More particularly, the invention relates to an improvement in such projection systems.

It is a general object of the invention to provide a new and useful improvement in projection systems.

Attention has recently been directed to development of projection systems for projection of bowling score information to a viewing screen to which reference may be made by bowlers and spectators during a bowling game for obtaining a given bowler's score status at any time during the game. Preferably, such a system should be capable of continuously projecting the bowler's scores and should permit updating of the scores without interruption of the image by the image-producing means such as a scorekeeper's hand or printing apparatus.

One approach has been to project bowling scores using a platen such as a prism having an interally light-reflecting surface. Light is directed through one rectangular prism face toward the internally reflecting surface at approximately an angle not less than the critical angle of the prism to obtain generally total internal reflection or substantially total internal reflection of the light from the reflecting surface. The internal reflecting surface is used as the image source, i.e., the image to be projected is impressed on the exterior of the prism surface, and the reflected light leaves the prism by another rectangular face and is thereupon directed by a suitable optical system to a viewing screen.

In such system, the image-producing means does not appear in the projected image, and images produced in the manner described may be regarded as acceptable but where the highest attainable degree of excellence is desired there may sometimes be an objectionable depth-of-field error. For example, where an image is reflected at an angle from a platen surface such as a prism surface, part of the image source appears (to an observer or to a projection lens) to be located closer than other parts because of its angular disposition with respect to the observer or lens, creating a depth-of-field error.

Where substantially the entire internally reflecting surface of the prism is used for an image source, as may be advantageous, the depth-of-field error is manifested in the peripheral portions of the image where the top and bottom of the image surface are slightly out of focus, sufficiently to be noticeable by a critical viewer when the image is transmitted to a remote screen. The top and bottom of the prism face are considered to be those portions adjacent respectively to intersections of two rectangular faces of the prism. If the image at the top is focused, the image at the bottom becomes more out of focus, and the converse is also true. Thus, such systems may be focused so that a central band of the image is in focus on the viewing screen with the top and bottom portions being slightly out of focus.

With the above in mind, another object of this invention is to provide a new and useful projection system including correction for depth-of-field.

A more specific object is to provide a system of the type described wherein the depth-of-field correction is accomplished by positioning the apparent image as viewed by the projection lens so that a single lens can focus the entire image upon the screen.

Another object is to provide correction means in a system of the type described including added glass varying in thickness across the plane of the image to bring the apparently more distant portions of the apparent image apparently closer to the projection lens.

A further object is to provide a correction means of the type described including added glass in the form of glass blocks in the projection path adjacent to the exit surface of the prism.

Other objects of this invention will be apparent to those in the art from the following descriptions and the drawings in which:

FIG. 1 is a perspective view of a projector device for projecting bowling scores and embodying a form of the present invention;

FIG. 2 is a partial vertical section through the lower housing of the device of FIG. 1 along line 2—2 of FIG. 1;

FIG. 3 is a partial vertical section through the device of FIG. 1 along line 3—3 of FIG. 1;

FIG. 4 is a partial horizontal section through the upper casing of the device of FIG. 1 along line 4—4 of FIG. 3; and FIG. 5 is a perspective view showing a projection system usable in the device of FIG. 1 and including a form of depth correction in accordance with the present invention, While an illustrative embodiment of the invention is illustrated in the drawings and will be described in detail herein, the invention is susceptible of embodiment in many different forms, and it should be understood that the present disclosure is to be considered as an exemplification of the principles of the invention and is not intended to limit the scope to the embodiment illustrated.

It is contemplated that the projection or viewing system of the present invention can be utilized in connection with one or more bowling lanes, e.g., by placement at the bowler's end of a bowling lane or plurality of adjacent bowling lanes, and that such bowling lane or bowling lanes may be equipped with automatic pin-setting and ball return equipment of conventional design and other equipment as may be desired.

Turning first to FIG. 1, there is illustrated a projector indicated generally by reference numeral 11 and including a lower casing or housing 12 for containing a light source and internally reflecting platen and an upper casing or housing 13 for containing a mirror and projection lens system. Casing 12 is supported from the floor or other suitable structure (not shown) by a pedestal 14 and the upper casing 13 is supported by a pair of support columns 15 from the top 16 of housing 12.

Referring now especially to FIGS. 2 and 3, casing 12 houses the light source and the image source platen of the illustrated system. It will be observed, especially with respect to FIG. 2, that the illustrated system includes a plurality of, i.e., two, projection system portions. Herein, wherever a reference numeral is given as identifying a component of one system, it is to be understood that a corresponding reference number in the other system describes the same or similar component. The drawings indicate the difference between the left-hand system and the right-hand system as viewed in FIG. 2 by letter suffixes $a$ and $b$ which may be used hereinafter in referring to the components in this specification. For example, a prism (see especially FIGS. 1 and 3) 19 is provided for each projections system with the drawings indicating reference numeral 19$a$ for the left-hand system and 19$b$ for the right-hand system; although the prism may be referred to hereinafter as "prism 19," it is to be understood that the appropriate one or ones of prisms 19$a$ and 19$b$ will be apparent from the context and the appropriate one or ones of the prisms is intended.

Prism 19 has secured thereto a first transparent platen such as glass block 20 and a second transparent platen such as glass block 21 and also has secured to another face thereof a condenser lens 22. The blocks 20 and 21 and lens 22 are secured face to face as shown by suitable cement indicated at reference numeral 23. Cement 23 in its set state is transparent, a suitable cement for this purpose being cellulose acetate adhesive. The assembly of prism 19, blocks 20 and 21 and condenser lens 22 is mounted by suitable brackets indicated by reference numeral 24 which slightly overlap the lateral edges of the assembly at the portions shown and which are eventually secured to casing 12 or top wall 16 by welds, bolts, or other conventional means.

A light source in the form of a light bulb 25 is mounted by a suitable bracket 26. A curved reflector 29, preferably spherical, mounted by bracket 30 adjacent bulb 25 is provided and disposed to reflect light from bulb 25 toward a preferably parabolic mirror 31 mounted by bracket 32. Both brackets 30 and 32 are mounted to bracket 26 which is in turn secured to wall 12. Reflector 29 and parabolic mirror 31 may be adjustable if desired; for example, parabolic mirror 31 is mounted to bracket 32 by means of a bolt and nut assembly 33a which may be loosened to pivot mirror 31 to a different position as desired for reflecting light from reflector 29 via mirror 31 into the surface of prism 19 having condenser lens 22 secured thereto. The wiring for projector light bulb 25 is conventional and the system is provided with a conventional dim-bright and on-off control 34.

A mirror 35 is disposed to receive light from the exit surface of prism 19 and blocks 20 and 21 and to reflect the light upward. Mirror 35 is mounted by a suitable bracket 36 secured to wall 12.

Mounted on the top surface of top wall 16, there is a frame member in the form of underframe 39 secured by screws 40 to wall 16 surrounding an opening in wall 16 best seen with reference to FIGS. 1 and 3. Underframe 39 has a central rectangular opening slightly smaller than the rectangular opening in wall 16 in which prism 19 is disposed so that underframe 39 serves as a flange member projecting over the edges of the top surface of prism 19.

A cover frame 41 is mounted to underframe 39 at the top edge thereof (with reference to FIG. 1) by means of hinge 42. Cover frame 41 is movable between an open position as illustrated in dotted lines in FIG. 3 and a closed position as illustrated by full lines in FIGS. 2 and 3. Cover 41 also has a generally central rectangular opening which is slightly smaller than the rectangular opening of underframe 39 so that when cover 41 is lifted to open position a score sheet the approximate size of the opening in underframe 39 may be placed on the upper face of prism 19 within the opening of underframe 39, and upon pivoting cover 41 to closed position, the score sheet will be held in place on the prism surface. The score sheet may be written or printed upon by hand or by other means through the opening in cover member 41 with cover member 41 in closed position.

Lower casing 12 is also provided with an exit port 43 disposed above mirror 35 and mirror 35 is positioned to reflect light from the prism and block assembly through the exit port 43 upward toward casing 13.

A blower 44 is mounted in the lower casing 12 by suitable means (not shown) and directs air toward a Y-shaped baffle which in turn baffles the air sideways as viewed in FIG. 2 toward each of projection bulbs 25 for cooling the light source areas of the two systems. Also mounted on suitable framework in casing 12 is a transformer 46 normally used in the wiring of a projection system including a light bulb and blower. The wiring of the present system is conventional and is not shown.

With reference now especially to FIGS. 3 and 4, casing 13, which is open or ported at the front thereof as indicated by reference numeral 49, houses a mirror 50 mounted by bracket 51 to casing wall 13 and mirrors 52 and 53 each mounted by a bracket 54 to casing wall 13. Mirror 50 is inclined at an angle of approximately 45° for reflecting light impinging mirror 50 from below toward mirror 52. Mirror 52 is in turn positioned vertically and angled laterally for directing light to mirror 53 which in turn directs the light from casing 13 through port 49. Each of mirrors 52 and 53 is mounted to bracket 54 by means of a screw and slot arrangement 55 for adjusting the disposition of the mirror on the bracket 54, e.g., for vertical adjustment. Each bracket 54 is releasably mounted at 56 by a screw, loosening of screw 56 permitting pivoting of bracket 54 for pivotal adjustment of mirror 52 or 53. Mirror 53 is secured at a slightly inclined disposition for reflecting light therefrom at a slight upward angle.

Light leaving mirror 35 in casing 12 through port 43 is directed by mirror 35 through an opening 59 in casing 13. Disposed across opening 59 is projection lens 60 secured by circumferential flange member 61 which is in turn attached to casing 13 by suitable screws shown at 62.

Referring now especially to FIGS. 3 and 5, in a projection system utilizing reflection from an internally reflecting prism surface, the light is passed through a first surface of the prism and is internally reflected from the second surface through the third surface of the prism. The second internally reflecting surface of the prism is the image receiving surface and corresponds to surface 64 of prism 19. The first surface is the light entrance surface 66 which has the condensor lens 22 secured thereto for condensing the light beam entering the prism. The third surface is the exit surface from the prism, surface 65. In operation of such a projection system, normally a score sheet is disposed on the exterior face of the internally reflecting surface of the prism. The score sheet is backed with carbon or other pressure transfer material for transferring an image printed on the exposed surface of the score sheet to the surface 64 of the prism as described by Roop in copending application Serial No. 288,719, filed June 18, 1963. The mark on the accessible or upwardly disposed surface of the score sheet, being produced by pressure on the score sheet surface, is transmitted to the surface 64 in the form of non-reflective carbon indicia or the like, corresponding to the indicia printed on the upper surface of the score sheet. The nonreflective areas of surface 64 created by the mark formed thereon destroys the inner reflectivity of this surface so that, as the light is internally reflected therefrom, an image of the indicia is carried by the reflected light from the prism.

A depth-of-field error results from the angular disposition of the image source at the prism face 64 relative to the projection lens 60. That is, the image source at the prism surface 64 is disposed in a plane inclined from a plane normal to the projection path, so that portions of the image, namely those portions at the left in FIG. 3, are further away, and appear to the lens to be further away from the lens than those portions at the right in FIG. 3 in the absence of correction means. The result of such angular disposition of the image source is that lens 60 cannot focus the entire depth of the image from top to bottom.

According to the present invention, correction means is provided whereby the image source is adjusted to an apparent position such that all portions thereof are sufficiently close to a plane normal to the projection path that the single projection lens 60 is able to satisfactorily focus the entire image on a viewing screen.

In order to explain the correction means, it should be understood that, while the actual image source lies in the plane of the prism surface 64, in the absence of correction means the apparent image source does not lie in such a plane but more nearly in a plane represented in FIG. 3 by the broken line $i_1$. This follows by virtue of the fact that the light is reflected from the surface 64 to the projection lens through the prism and in passing through the glass-air interface (in the absence of glass blocks 20 and 21) at the surface 65 into the less dense medium, the source appears to be located closer to the interface than it actually is. Since different portions of the image pass through varying thicknesses of prism glass, different portions will appear to be at varying distances from the actual source as indicated approximately by the line $i_1$. Even though the apparent image is less objectionably angularly disposed than the actual image source, the lens 60 cannot focus the entire image.

It can be shown that the distance along the projection path from the surface 65 to the surface 64 at any point in the image is related to the distance from the surface 65 to the plane $i_1$ as expressed in the following formula:

(1) $$\frac{t}{y} = \frac{\cos A}{\sqrt{M^2 - \sin^2 A}}$$

wherein:

$y$ = the distance along the projection path from the surface 65 to the surface 64 at any point in the image,
$t$ = the distance along the projection path from the surface 65 to the plane $i_1$ at the same point in the image,
$M$ = the refractive index of the glass of prism 19, and
$A$ = the exit angle of light from the surface 65.

For small exit angles, as will usually occur, Cos A approaches 1, and sin A approaches zero, so that for practical purposes the formula may be:

(2) $$\frac{t}{y} = \frac{1}{M}$$

In accordance herewith, the apparent image is moved, e.g., in portions, to a position from which it can be properly focused across the whole area thereof by means of the projection lens 60. Movement or adjustment of the image as viewed from lens 60 in the illustrated embodiment is accomplished by means of the glass blocks 20 and 21 inserted in the projection path adjacent face 65. These glass blocks function to change the disposition of portions of the apparent image by moving the portions of the apparent image closer to surface 65.

FIG. 5, for simplicity, illustrates the disposition of the optical system employing the error correction means with the casing, brackets and other associated elements removed. Referring now especially to FIGS. 3–5, the light path from the light source to a viewing screen 70, as illustrated by broken lines, will be understood. Light from source 25 is reflected from reflector 29 and directed by parabolic mirror 31 through condensor lens 22 and through face 66 of prism 19 and is reflected from internally reflecting surface 64. The lgiht beam picks up the image from surface 64 as it is reflected therefrom and the internally reflected image leaves the prism through face 65. The upper one-third of the image as illustrated in FIG. 5 leaving face 65 proceeds directly to reflecting mirror 35; the middle one-third of the image is directed through glass block 20 and the lower one-third of the image is directed through glass blocks 20 and 21 prior to reflection from mirror 35. Blocks 20 and 21 serve to reorient the apparent image as viewed by projection lens 60 so that each portion of the image is within focus with respect to lens 60 for projection to screen 70. Thus, the reflected image from mirror 35 passes through lens 60 and is thereafter reflected by mirrors 50, 52 and 53 onto screen 70 and the projected image on screen 70 is corrected with respect to depth-of-field.

From Formula 2 for small angles, it can be shown that the effective shortening of the optical path length resulting from insertion of some thickness of glass at the interface 65 is represented by the following formula:

(3) $$x = y_{gb} \frac{(M-1)}{M}$$

wherein:

$x$ = the effective shortening of the optical path length resulting from insertion of some thickness of glass at the interface 65,
$y_{gb}$ = the thickness of glass inserted at the interface 65, and
$M$ = the refractive index of the glass inserted.

Thus, if the platen 19 is a right angle prism with equal sides 65 and 66, each having a height of 1.85 inches, the maximum distance $t$ from the exit face 65 of the prism to the effective image plane $i_1$ will be 1.218 inches, using Formula 2, if M equals 1.518. Assuming that the portions of the apparent image to be moved to positions for focusing by a projection lens are generally thirds of the height of the apparent image, in order to bring each third of the apparent image into an area for focusing, approximately close to the exit face 65 of a prism, the furthest two-thirds of the image will have to be moved .406 inch (1.218 divided by 3), and the furthest third of the image will have to be moved an additional .406 inch.

From Formula 3, it will be seen that the thickness of the glass blocks needed to move the apparent image portions the necessary distances will be:

(4) $$y_{gb} = \frac{xM}{M-1}$$

If M for the glass block is 1.518, substituting in Formula 4, $y_{gb}$ will be 1.19 inches.

Thus, in the illustrated example, each of blocks 20 and 21 would be 1.19 inches thick, block 20 governing the lower two-thirds of face 65 and block 21 covering the lower half of the exit face of block 20. The portions or thirds of the apparent image no longer all lie in the plane of $1_1$; rather, two portions are moved by the glass blocks to planes $i_2$ and $i_3$, respectively, within an area more nearly parallel with the prism exit face and not so deep that it cannot be clearly focused in a singular depth-of-field by the lens.

For practical purposes of relating the thickness of the glass blocks to be inserted to the size of the prism, using the information set forth hereinabove, it can be shown that for ideal optical placement of three separate image planes of approximately equal size by using glass slabs or blocks, the thickness of each glass block may be determined by reference to the following formula:

(5) $$y_{gb} = \frac{\text{the prism base height}}{3(M-1)}$$

It has been found in systems employing the plurality of blocks that a very sharp, clean line may appear in the projected image between the image portions, that is, at the edge of each block. However, this line can be superimposed over a framing line of a score sheet and is not a drawback in use of the projection system for projecting bowling scores. Clear, sharp images were produced using this system at full brightness and no magnification problems were apparent. Thickness of the glass blocks inserted will vary depending on the proportion of exit face covered by a particular glass block.

I claim:

1. A projection system which comprises a projection lens, a platen having a reflecting surface for receiving an image marked thereon, a light source and means associated therewith for reflecting light from said reflecting surface thence along an optical path, means mounting the projection lens in said opeical path for receiving and focusing light transmitted from said reflecting surface through said optical path, means mounting said platen in the optical path with said reflecting surface at an angle relative to said optical path which is different from the angle of said lens relative to said optical path, light-transmitting means on the platen between the reflecting surface and the projection lens for receiving the portion of the image reflected from the portion of the reflecting surface of said platen farthest from said projection lens to move the effective image as viewed by the projector lens sufficient to provide generally uniform depth-of-field in the projected image.

2. The projection system of claim 1 wherein said light-transmitting means on the platen comprises a glass block.

3. A projection system which comprises a projection lens, a first light-transmitting platen having an internally reflecting surface for receiving an image marked thereon, a light source, means associated with said light source for directing light to said reflecting surface to reflect therefrom along an optical path, means mounting said lens in and transverse to said optical path, means mounting said platen in the light-receiving optical path of said projection lens with said internally reflecting surface at an angle relative to said optical path different from the angle of said lens to said path, a second light-transmitting platen, second mounting means mounting said second platen in said optical path between the reflecting surface and the projection lens, said second light-transmitting platen means having decreasing thickness across said optical path with the thickest portion of said light-transmitting platen means aligned to receive the portion of the image reflected from the portion of the internally reflecting surface farthest from said projection lens.

4. The projection system of claim 3 wherein said first platen is a triangular prism having three rectangular faces, the first face of which defines the internally reflecting surface, said means associated with said light source comprises means for directing a beam of light through a second face to reflect internally from said first face for exiting from the prism through the third face.

5. The projection system of claim 4 wherein the second platen means comprises a rectangular glass block.

6. The projection system of claim 5 wherein said second mounting means comprises means securing the glass block to the third face of the prism adjacent the prism edge between the second and third faces, and said glass block extends only a portion of the distance across the third face toward the opposite edge.

7. The projection system of claim 5 wherein said second light-transmitting platen means comprises a plurality of glass blocks and said second mounting means comprises means mounting said blocks to define a stepped light-transmitting platen decreasing in step thickness in the direction across the optical path.

8. A projection system comprising a light-transmitting prism having three faces including a first face defining an internally light-reflecting surface for receiving a legend marked on the exposed side thereof, a light source and means associated therewith for directing a beam of light through the second or entry face of said prism and reflecting the light from said reflecting surface and from said prism through the third or exit face of said prism, a rectangular glass block on the portion of the exit face farthest from said reflecting surface and in surface contact with said prism for receiving a portion of the reflected image directly from said prism, said glass block extending outwardly from the prism face in a direction generally parallel to the exiting beam of light, a projection lens, and means mounting said projection lens at an angle to the exiting beam of light different from the angle of the internally reflecting surface to said exiting beam of light for receiving and projecting the light exiting from said prism and glass block to a viewing screen.

9. A projection system comprising a light-transmitting prism having an internally light-reflecting surface, means for applying an image to the outer face of said reflecting surface including an opaque sheet, a light source, means associated with the light source for directing light toward said internally reflecting surface and reflecting the light therefrom, projection lens means, means mounting said projection lens means at an angle relative to said internally reflecting surface for receiving light reflected from said internally reflecting surface with said projection lens focused for proper depth of field projection of light received adjacent the closest portion of said reflecting surface to said lens, and light-transmitting platen means in the light path from the portion of said reflecting surface farthest from said lens along the light path, said platen means being of sufficient thickness to move at least a portion of the apparent image of said reflecting surface farthest from said lens into general alignment with the apparent image from the portion of said reflecting surface closest to said projection lens along the light path, a viewing screen, and means directing the projected image from said lens to said viewing screen.

10. A score projection system which comprises a light transmitting prism having an internally reflecting surface, the exterior of which constitutes an image receiving surface adapted to have a score legend impressed thereon, a light source, means for directing light from said light source through a second surface of said prism toward said internally reflecting surface for reflecting an image of said score legend angularly therefrom and exteriorly through a third exit surface of the prism, mirror means for directing the reflected image from said reflecting surface toward a viewing screen, projection lens means for focusing the image from the prism on a viewing screen, a first glass block on the exit surface of the prism covering approximately the two-thirds of the exit surface furthest from the image receiving surface, said first block being of a thickness sufficient to move the apparent image from the central one-third of the prism as viewed by the projection lens into the same general depth disposition as the apparent image from the one-third of the exit surface closest to the image receiving surface, and a second glass block on the exit surface of said first glass block covering approximately the one-half of said first block exit surface furthest from said image receiving surface, said second block being of a thickness sufficient, with the first glass block, to move the apparent image from the one-third of the prism furthest from the image receiving surface into the same general depth disposition as the apparent image from the other two-thirds of the prism exit surface.

11. The system of claim 10 wherein the prism is a 45°–90°–45° prism with an image surface about 4 inches tall forming the hypotenuse, said first block is about 1½ inches thick and about 2 inches tall and said second block is about 2 inches thick and about 1 inch tall.

12. The system of claim 10 wherein the prism is right angle isosceles prism and the prism, first block and second block are approximately proportional to each other with respect to prism hypotenuse height: first block thickness: second block thickness in accordance with the ratio 4.0:1.52:1.91.

13. The system of claim 10 wherein the prism is a right angle isosceles prism with a base and height of about 1.85 inches, and each block is about 1.19 inches thick and the first block has a height about two-thirds the height of the prism and the second block has a height about one-third the height of the prism.

References Cited by the Examiner

UNITED STATES PATENTS

| 1,319,292 | 10/1919 | Kunz | 88—1 |
|---|---|---|---|
| 2,685,227 | 8/1954 | Brietzke | 88—240 |
| 2,821,108 | 1/1958 | Warmisham et al. | 88—57 X |
| 2,858,731 | 11/1958 | Rehorn | 352—57 X |
| 3,138,059 | 6/1964 | White | 88—24 |
| 3,174,414 | 3/1965 | Myer | 88—24 X |

FOREIGN PATENTS 929,675    6/1963    Great Britain.

NORTON ANSHER, *Primary Examiner.*

H. H. FLANDERS, *Assistant Examiner.*